UNITED STATES PATENT OFFICE.

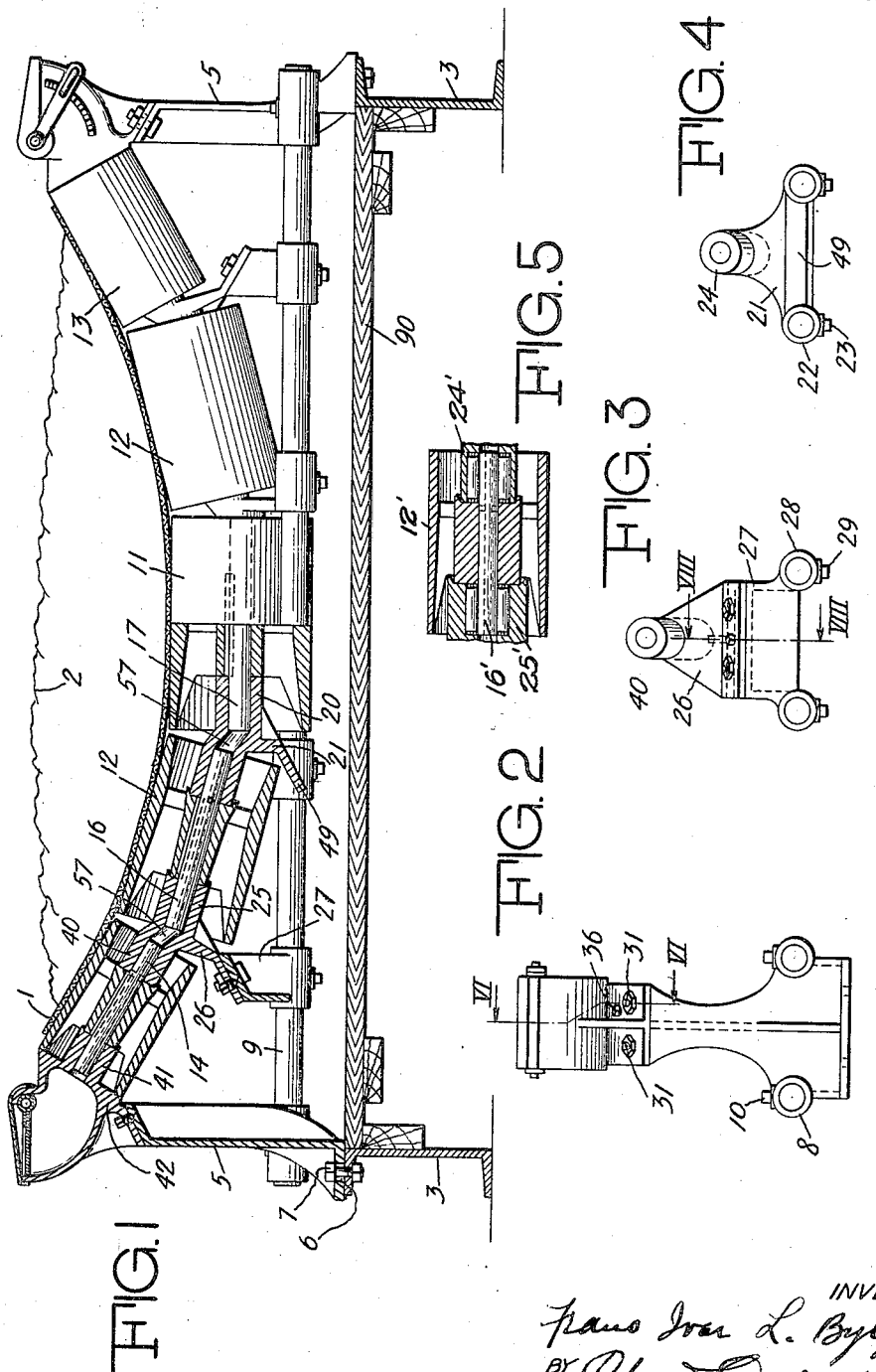

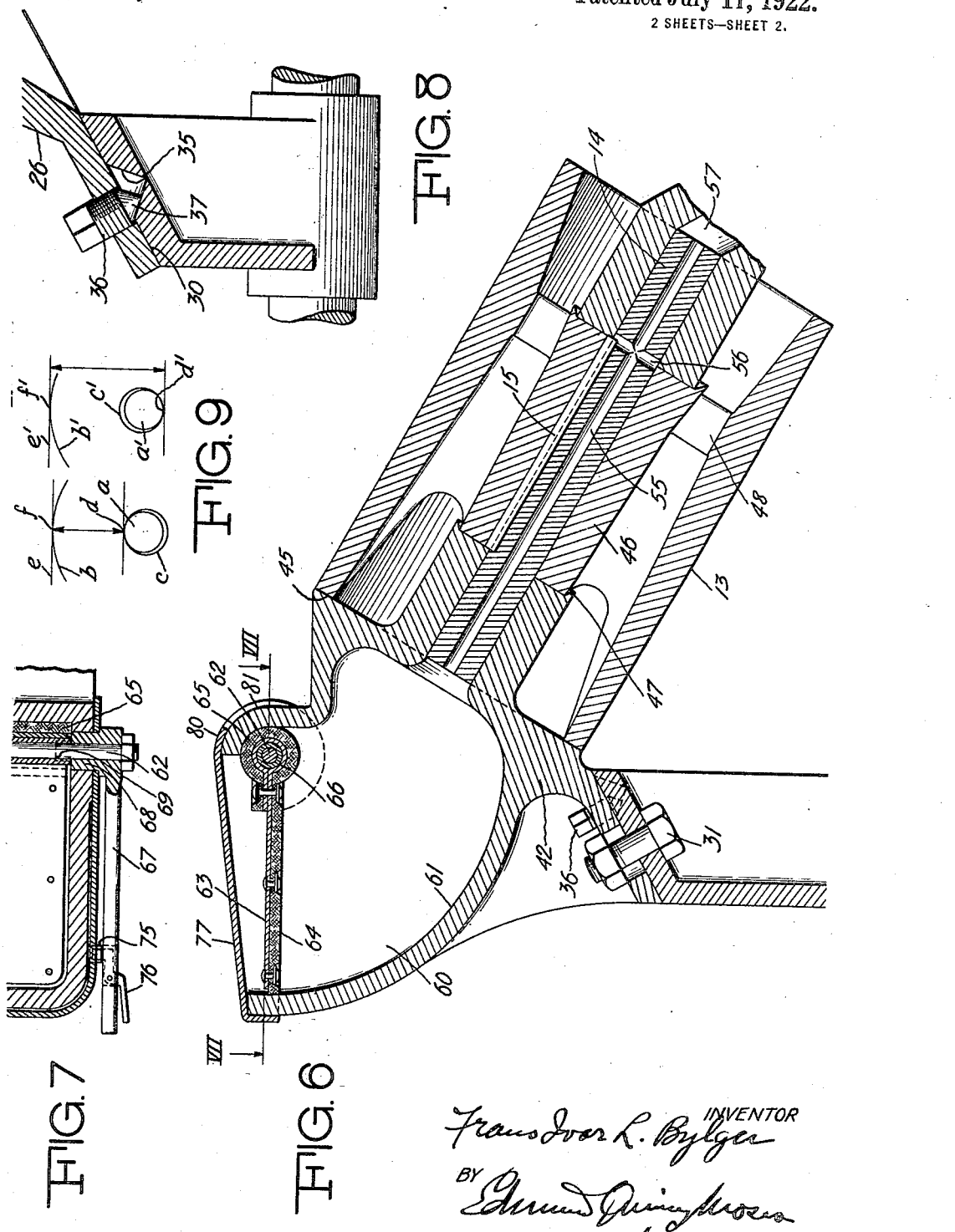

FRANS IVAR L. BYLGER, OF JERSEY CITY, NEW JERSEY.

TROUGHING PULLEY FOR BELT CONVEYERS.

1,422,662.   Specification of Letters Patent.   Patented July 11, 1922.

Application filed June 3, 1919. Serial No. 301,486.

*To all whom it may concern:*

Be it known that I, FRANS IVAR L. BYLGER, a citizen of the United States, residing in Jersey City, county of Hudson, and State of New Jersey, have invented certain new and useful Improvements in Troughing Pulleys for Belt Conveyers, of which the following is a specification.

This invention relates to a pulley or idler construction for supporting conveyer belts, and comprises certain features of improvement designed to simplify the construction and facilitate the assembling and adjustment of the belt-supporting devices, to improve the efficiency thereof, to enhance durability by protecting the bearings from dust and dirt and improving the lubrication of the bearings, and to obtain other objects and advantages, the nature of which will more fully appear from the following description of one preferred embodiment of my invention taken in connection with the accompanying drawings which show such preferred embodiment as illustrative of the principle of the invention and the best mode now known to me for performing the same.

In the drawings, Figure 1 is a view, partly in side elevation and partly in section, showing a set of idlers and supporting means therefor, illustrating a preferred form of the invention;

Figure 2 is an end view of one of the end brackets;

Figure 3 is a similar view of one of the intermediate brackets;

Figure 4 is a similar view of one of the middle brackets;

Figure 5 is a detail view illustrating the use of roller bearings for the pulley shafts;

Figure 6 is a sectional view on a large scale showing one of the end idlers and its shaft and the bearings thereof, and also showing a part of one of the end brackets and the lubricant reservoir formed therein, the position of the section being indicated by the line VI—VI of Figure 2;

Figure 7 is a fragmentary sectional view on line VII—VII of Figure 6;

Figure 8 is a detail sectional view through a part of the intermediate bracket taken on line VIII—VIII of Figure 3;

Figure 9 is a diagram illustrating the action of the pulley shafts in their bearings in the present construction, as compared with the action of a pulley mounted to turn loosely on a fixed shaft.

In Figure 1 I have shown a belt support consisting of five pulleys, although it will be understood that a greater or less number of pulleys in each group may be provided, as desired. In the drawings, the numeral 1 designates the conveyer belt, the upper run of which is to be supported in troughed shape so that it will properly hold the material to be conveyed, indicated by the broken line 2. 3 are longitudinally extending supporting girders which may be of any suitable construction. Sets of troughing idlers are mounted on these girders at the desired intervals for properly supporting the travelling belt. In the preferred construction illustrated I provide end brackets 5 which are adapted to be attached to the girders 3 in any suitable manner, provision preferably being made for the adjustment of the end brackets upon the girders. As illustrated, the end brackets are provided with the elongated holes or slots 6 which receive the attaching bolts 7. The end brackets are formed with the sleeve portions 8 which receive and support the ends of the transverse supporting bars 9, which may be secured in the sleeves in any suitable manner, as by means of the set screws 10. The bars 9 are preferably of cylindrical form as shown, as this facilitates construction, and makes it simply necessary to bore holes in the sleeves 8 and in the bracket members to be mounted on the bars 9, but the cylindrical form is not essential and any other suitable form of supporting bar may be substituted therefor. I prefer to use a pair of laterally spaced supporting bars, but this number and arrangement of bars also is not essential and may be departed from, if desired. In the construction illustrated I provide a middle pulley 11, a pair of intermediate pulleys 12 and a pair of end pulleys 13, the latter being shown as of smaller diameter than the intermediate pulleys, which in turn are of smaller diameter than the middle pulley. This grading of the size of the pulleys is a valuable feature, as it provides for the proportioning of the pulley diameters in accordance with the load to be carried thereby, the larger pulleys carrying the heavier loads. The outer pulleys which carry the lighter loads may accordingly be reduced to the smallest diameter consistent with such light loads, and the apparatus as a whole may be reduced to a most compact form and be manufactured at a minimum cost. Each of the pulleys is preferably mounted on and fixed to its individual shaft, the pulleys 13 being fixed to shafts 14 by means of keys 15 or otherwise, and the pulleys 12 and 11 being similarly secured respectively to shafts 16 and 17. The shaft 17 of the middle pulley 11 is supported at each end in a bearing 20 of a middle bracket 21, two of which are utilized in the construction illustrated, mounted on the supporting bars 9. For this purpose the brackets 21 are provided with sleeves 22, through which the supporting bars pass, means being provided for securing the brackets in position on the bars 9, for instance, the set screws 23. The middle brackets 21 are also provided with bearings 24 which receive the inner ends of the shafts 16. The outer ends of the shaft 16 are supported in the bearings 25, formed on the upper frames 26 of the intermediate brackets 27, which are provided with sleeve portions 28 fitting on the supporting bars 9 and adjustably secured thereon by the set screws 29. The upper frames 26 are preferably adjustably attached to the brackets 27, the construction shown for this purpose consisting in providing the brackets 27 with the outwardly inclined bearing surfaces 30 on which rest similarly inclined bearing surfaces on the upper frames. The two inclined members are provided with holes, the holes in one member being elongated so as to permit of the members being secured in adjusted position by the securing bolts 31. In order to facilitate a fine adjustment of the upper frame 26 upon the bracket 27, a conical depression 35 is preferably formed in the inclined face 30 thereof, as shown in Figure 8, the member 26 carrying a set screw 36 having a conical point 37 adapted to be received in the depression 35 and to coact with the outer inclined wall thereof. By loosening the bolts 31 and screwing the set screw in or out, it will be seen that the member 26 will be adjusted along the surface 30. The set screw 36 also serves as a means for positively preventing slipping of the member 26 down the inclined surface 30 after the initial adjustment has been secured. Any other suitable means for effecting the desired adjustment and for securing the parts together may be employed. The upper frame 26 has a bearing portion 40 which receives the inner end of the shaft 14 of the outer pulley. In order to more firmly support such shaft a bearing 41 is preferably provided for the outer end thereof, such bearing being shown as formed in an upper frame 42 adjustably mounted on the end bracket 5. In the construction illustrated the mounting of the frame 42 upon the end bracket 5 is similar to the mounting of the member 26 upon the intermediate bracket 27, attaching bolts 31 and set screws 36 being illustrated for this purpose. The pulley shafts 14, 16 and 17, instead of being journaled directly in the bearings 41, 40, 25, 24 and 20, may be journaled in roller bearings as shown in Figure 5 in which the pulley 12′ having a shaft 16′ is shown as journaled in roller bearings 24′ and 25′.

The construction described provides for the ready assembling and accurate adjustment of the parts so as to secure free running of the various pulley shafts. This is accomplished by first placing the two middle bearings with the middle pulley between them and adjusting the brackets along the supporting bars 9, so that the shaft 17 properly turns within the bearings 20. The intermediate pulleys and the intermediate brackets are then placed in position and by adjusting the brackets along the bars 9 and at the same time adjusting the upper frames 26 upon the inclined surfaces 30 of the brackets, both endwise and vertical adjustment of the bearings 25 is secured, so that the bearings may be accurately set to properly support the pulley shafts. The pulleys 13 mounted on their shaft 14 are next placed in position and by proper adjustment of the end frames 5 and the upper frame 42 upon the inclined surfaces of the latter, endwise and vertical adjustment of the bearings 41 is secured so as to properly support the outer ends of the shafts 14. It will be seen that accurate adjustments of all of the bearings of all of the shafts may thus be secured so as to obtain the best running conditions for the bearings. In order to prevent dust and grit from the material being conveyed from reaching the bearings, so far as possible, the members 42 are preferably provided with the shoulder portions 45 which the outer ends of the pulleys 13 almost touch, so as to keep the dust from falling into the pulleys. The hubs 46 of the pulleys are also preferably tapered somewhat from the inner to the outer ends as shown, the outer end of the hub being made of slightly smaller diameter than the diameter of the bearing so that any dust falling into the end of the pulley and upon the outside of the bearing will tend to pass across the crack between the end of the bearing and the end of the hub without entering such crack and finding its way into the bearing itself. In order to further secure this result the end of the bearing may be formed with a slight flange or petticoat, as indicated at 47 in Figure 6. The pulleys are also preferably formed with spokes or perforated webs 48 so that the dust will not accumulate within them, but will pass on through and out the other end. In order that the dust will not pass from one pulley to the next the bracket members 26 and brackets 21 are preferably shaped so as to deflect this dust away from the next pulley, the bracket 21 being formed with an inclined web 49 adapted to extend between the adjacent pulleys for this purpose.

Lubrication of the bearings may be provided for in any suitable manner. In the construction illustrated, the shafts 14 and 16 are shown as provided with the longitudinal passage-ways 55 and transverse openings 56 (see Figure 6) and the bearings in the intermediate and middle brackets are connected by the passage-ways 57. The lubricant which is supplied at the outer ends of the outer shafts, lubricates the outer end bearings of such shafts, and passes through the passage-ways 55 in the outer shafts, some of it passing through the passage-ways 56 to lubricate the inner bearings of such shafts, and the rest of it passing through the openings 57 to the next shafts where it lubricates the bearings thereof. Thus all the bearings are thoroughly lubricated from the outer ends of the outer shafts. Any suitable means may be provided for supplying lubricant at such points, but preferably I form lubricant reservoirs 60 in the upper members 42 of the end brackets 5. In the construction illustrated these reservoirs 60 are of quadrant shape having cylindrical walls 61 which are concentric with the axes of shafts 62 carried by the upper frames 42. Mounted on the shafts 62 are follower plates 63 which are adapted to be forced down in the lubricant reservoirs 60 so as to press the grease contained in such reservoirs into the passage-ways in the shafts 14. In order to provide for a close fit of the followers in the reservoirs to permit the necessary pressure to be applied to the grease, the follower plates preferably have secured to their lower surfaces a packing 64 of felt or other flexible material which projects beyond the edges of the plates and which may also be carried around the shafts 62, as shown in Figures 6 and 7 at 65, thus preventing the escape of the grease back of the shafts. The plates 63 may be mounted on the shafts in any suitable manner, as by being bent to form a surrounding loop or tubular portion 66. For the purpose of forcing down the followers I preferably provide a handle 67 on the outside of the lubricant reservoir, which is mounted on the projecting end of the shaft 62 and which has a neck 68 extending through the wall of the reservoir and provided with lugs 69 engaging notches in the sleeve portion 66, in the manner of a jaw clutch. For holding the follower down in adjusted position, a notched segment 75 may be provided on the outside of the lubricant reservoir adapted to be engaged by a pawl 76 on the handle 67. To keep dirt from entering the lubricant reservoir a hinged sheet metal cover 77 is preferably provided, which is held in place by the shaft 62 and handle neck 68 projecting through perforations therein, and which has a curved lip 80 adapted to slide over a curved surface 81 on the reservoir. The construction described is effective and may be very quickly operated, thereby greatly reducing the labor involved in refilling and actuating the large number of lubricating units which would be present in a complete conveyer system. In filling the reservoir it is merely necessary for the operator to lift up the handle 67, thus opening the cover. The lubricant is then placed in the receptacle and the follower and cover brought down. When it is necessary to feed additional lubricant it is merely necessary for the operator to push down on the handle 67 causing the pawl to move down a notch or two on the segment 75 which holds the follower and handle in position. This operation can be quickly performed so that the operator may attend to the lubrication of a large number of the bearings in a very short time. It will be understood that grease, oil saturated waste or other lubricant may be placed in the reservoir 60; also that any other suitable type of lubricant reservoir or grease cup may be utilized instead of such reservoir.

The fixing of the pulleys on the shafts which turn in fixed bearings is much better than the more common way of mounting the pulleys by having them turn freely on fixed shafts. One reason for this is that the leverage exerted on the pulley by the travelling belt is applied more effectively in the former case. This is illustrated by the diagrams in Figure 9 where the usual construction is shown at the left and the improved construction at the right. Supposing $a$ to indicate a fixed shaft on which rotates a pulley $b$, having a bearing $c$ therein, it will be seen that the point of pressure is above the axis of the shaft, as indicated at the point $d$. The conveyer belt $e$ acts on the pulley at the point of tangency $f$, so that the effective lever arm of the force acting to overcome the friction of the bearing is represented by the distance $d\ f$. On the other hand where the pulley $b'$ is fixed to the shaft $a'$, which runs in the bearings $c'$, it will be seen that the frictional resistance is practically applied at or near the point $d'$ which is below the axis of the shaft instead of above it. The effective lever arm is therefore represented by the distance $d'\ f'$, which is greater than the lever arm $d\ f$ in the former case by an amount approximately equal to the diameter of the bearing. In the case of a small pulley this represents a considerable percentage, the result being that the force necessary to overcome the resistance of friction is very much less where the pulley is fixed to the shaft than where the pulley turns on a fixed shaft. There is much less danger of the pulley sticking and failing to revolve in the former case than in the latter, greater durability of the bearing is secured and better lubrication conditions obtained, the latter result being due in part at least, to the fact that with the revolving hollow shaft having the lubricating openings therein the lubricant is more likely to be properly distributed than in the case of a fixed hollow shaft where the lubricant will be projected into the bearing in a fixed direction only.

The space between the girders 3 is preferably closed by a deck as indicated at 90, in Figure 1, which acts to prevent dust or material falling from the conveyer from sifting through on to the inner surface of the lower run (not shown) of the conveyer belt.

From the foregoing it will be seen that the construction described provides a supporting means for a conveyer belt which may be cheaply built and quickly assembled, but which at the same time provides for a more accurate mounting and more effective supporting of the pulleys, than is to be found in many, if not all, of the constructions now in use. It will further be understood that the specific construction described and shown in the drawings is merely illustrative of the preferred manner of performing the invention and that modifications may be made therein without departing from the scope thereof. Some of the features of the invention described may also be used without others, as it is not necessary that all of the novel and valuable features should be utilized in a single construction in order to secure many of the benefits of the invention. In the appended claims, therefore, I do not intend to limit myself to specific features any further than particularly set forth, but intend to cover my invention broadly in whatever form its principle may be embodied.

Having thus described my invention, I claim:—

1. In a conveyer belt support, a supporting member, and a bracket mounted thereon carrying a pair of bearings connected to one another by an oil passage, one of said bearings being offset in an upward direction from the other of said bearings.

2. In a conveyer belt support, a supporting member, and a bracket mounted thereon carrying a pair of bearings angularly disposed with relation to one another and connected to one another by an oil passage, one of said bearings being offset in an upward direction from the other of said bearings.

3. In a conveyer belt support, a supporting member, a bracket mounted thereon carrying a pair of bearings connected to one another by an oil passage, shafts supported in said bearings, and belt supporting pulleys of different diameters carried by said shafts, one of said bearings being offset in an upward direction from the other of said bearings whereby the belt supporting surfaces of the pulleys will be positioned for proper engagement with the belt.

4. In a conveyer belt support, supporting means, a pair of brackets mounted thereon carrying inwardly extending aligned bearings and outwardly extending bearings offset in an upward direction from said inwardly extending bearings, a second pair of brackets mounted upon said supporting means carrying bearings facing the offset bearings of said first-mentioned brackets and in alignment therewith, shafts supported within the several pairs of aligned bearings, and pulleys carried by said shafts, the outer pulleys being of less diameter than the inner pulley.

5. In a conveyer belt support, a supporting means extending transversely of the path of the belt, brackets mounted on said supporting means, a pair of bearings carried by each of said brackets, a pulley fixed to a shaft journaled in one of the bearings of each bracket, other brackets mounted on said supporting means and adjustable longitudinally thereof, bearings carried by said last named brackets and adjustable vertically with reference thereto and pulleys fixed to shafts journaled in said last named bearings and in the bearings carried by the first named brackets.

6. In a conveyer belt support, a supporting means extending transversely of the path of the belt, middle brackets mounted on said supporting means and adjustable longitudinally thereof, inwardly extending complementary bearings carried by said middle brackets, a center pulley fixed to a shaft journaled in said bearings, other bearings carried by said middle brackets and extending outwardly and upwardly therefrom, other brackets mounted on said supporting means and adjustable longitudinally with reference thereto, bearings carried by said last named brackets and adjustable vertically with reference thereto, and pulleys fixed to shafts journaled in said last mentioned bearings and in the bearings extending outwardly from the first mentioned brackets.

7. In a conveyer belt support, end brackets adjustable toward and away from one another, a supporting means for other brackets extending between and supported by said end brackets, middle brackets mounted on said supporting means and adjustable longitudinally thereof, inwardly extending complementary bearings carried by said middle brackets, a center pulley fixed to a shaft and journaled in said bearings, other bearings carried by said middle brackets and extending outwardly and upwardly therefrom, intermediate brackets mounted on said supporting means between the middle brackets and the end brackets and adjustable longitudinally with reference to said supporting means, bearings carried by said intermediate brackets and adjustable vertically with reference thereto, bearings carried by said end brackets and adjustable vertically with reference thereto, and pulleys fixed to shafts journaled in the bearings on the middle, intermediate and end brackets.

8. In a conveyer belt support, supporting means, end brackets mounted upon said supporting means carrying inwardly extending bearings, middle brackets mounted upon said supporting means having inwardly and outwardly extending, angularly disposed bearings, said inwardly extending bearings facing one another, intermediate bearings mounted upon said supporting means carrying angularly disposed bearings facing the outwardly extending bearings in said middle brackets, and angularly disposed bearings facing the inwardly extending bearings in said end brackets, means for adjusting said several brackets upon said supporting means to align the pairs of facing bearings, shafts supported within the aligned pairs of facing bearings, and pulleys carried by said shafts.

9. In a conveyer belt support, a bracket having an inclined face, a member adjustably mounted upon said inclined face and carrying a pair of bearings angularly disposed with relation to one another, the plane of the inclined face of said bracket being at an angle with the axis of each of said bearings.

10. In a conveyer belt support, a bracket having an inclined face and a pulley shaft supporting member having an inclined face engaging the inclined face on said bracket, bolts for securing said bracket and pulley supporting member together and a pointed set screw mounted in one of said members and engaging an inclined surface on the other member.

11. In a conveyer belt support, supporting girders, end brackets mounted thereon, a transverse support carried by said end brackets, brackets adjustably mounted on said transverse support, pulley shaft carrying members on said brackets, and supports for the outer ends of the outer pulley shafts carried on said end brackets.

12. In a conveyer belt support, the combination of supporting girders, a single end bracket mounted on each girder, a plurality of transverse supporting bars having their ends mounted on said end brackets, and intermediate pulley supporting brackets mounted on said transverse bars.

13. In a conveyer belt support, supporting girders, end brackets mounted for lateral adjustment thereon, transverse supporting bars adjustably mounted in recesses in said end brackets, intermediate brackets adjustably mounted on said supporting bars and belt supporting pulleys having shafts carried by said brackets.

14. In a conveyer belt support, end brackets, a transverse supporting member carried thereby, middle brackets adjustably mounted on said supporting member, a middle pulley supported upon said middle brackets, intermediate brackets located between said middle brackets and said end brackets, intermediate pulleys supported upon said middle brackets and said intermediate brackets, and outer pulleys supported upon said intermediate brackets and said end brackets.

15. In a conveyer belt support, end brackets, a transverse supporting member carried thereby, middle brackets adjustably mounted on said supporting member, a middle pulley having a shaft mounted between said middle brackets, intermediate brackets located between said middle brackets and said end brackets, intermediate pulleys having shafts mounted between said middle and intermediate brackets, and outer pulleys having shafts mounted between said intermediate brackets and end brackets.

16. In a conveyer belt support, end brackets, a transverse supporting member carried thereby, middle brackets adjustably mounted on said supporting member, a middle pulley having a shaft mounted between said middle brackets, intermediate brackets located between said middle brackets and said end brackets, intermediate pulleys having shafts mounted between said middle and intermediate brackets, and outer pulleys having shafts mounted between said intermediate brackets and end brackets, all of said shafts being mounted to rotate in bearings carried by said brackets, said pulleys being fixed to turn with their respective shafts.

17. A conveyer belt support comprising a set of troughing pulleys, the pulleys in the middle being of greater diameter than the pulleys at the ends, shafts carrying said pulleys, and supports for said shafts mounted for horizontal and vertical adjustment.

18. In a conveyer belt support, supporting means, a pair of brackets mounted thereon carrying inwardly extending, aligned bearings and outwardly extending bearings angularly disposed with respect to said inwardly extending bearings and offset in an upward direction therefrom, a second pair of brackets mounted upon said supporting means carrying bearings facing the angularly disposed bearings of said first mentioned brackets and in alignment therewith, and pulleys supported within the several pairs of aligned bearings, the outer pulleys being of less diameter than the inner pulley.

19. In a conveyer belt support, supporting means, a pair of brackets mounted thereon carrying inwardly extending, aligned bearings and outwardly extending bearings angularly disposed with respect to said inwardly extending bearings and offset in an upwardly direction therefrom, a second pair of brackets mounted upon said supporting means carrying bearings facing the angularly disposed bearings of said first mentioned brackets and in alignment therewith, shafts journaled within the several pairs of aligned bearings, and pulleys secured to said shafts, the outer pulleys being of less diameter than the inner pulley.

20. In a conveyer belt support, supporting means, a pair of brackets mounted thereon carrying inwardly extending, aligned bearings and outwardly extending bearings angularly disposed with respect to said inwardly extending bearings and offset in an upwardly direction therefrom, a second pair of brackets adjustably mounted upon said supporting means carrying bearings facing the angularly disposed bearings of said first-mentioned brackets and adapted to be aligned therewith, shafts journaled within the several pairs of aligned bearings, and pulleys secured to said shafts, the outer pulleys being of less diameter than the inner pulley.

21. In a conveyer belt support, supporting means, a pair of brackets mounted thereon carrying inwardly extending, aligned bearings and outwardly extending bearings angularly disposed with respect to said inwardly extending bearings and offset in an upwardly direction therefrom, a second pair of brackets adjustably mounted upon said supporting means carrying adjustable bearings facing the angularly disposed bearings of said first-mentioned brackets and adapted to be aligned therewith, shafts journaled within the several pairs of aligned bearings, and pulleys secured to said shafts, the outer pulleys being of less diameter than the inner pulley.

22. A conveyer belt support comprising a set of troughing pulleys, shafts upon which said pulleys are carried, and supports for said shafts, the supports for the outer ends of the outermost shafts having annular shoulders registering with and fitting closely over the ends of the pulleys carried thereby to assist in keeping dirt and dust from entering the pulleys.

23. A supporting bracket for adjacent belt supporting pulleys, having an inclined web extending between the pulleys and shaped so as to deflect the dust passing from one pulley away from the adjacent pulley.

24. In a conveyer belt support, spaced bearings, an inclined shaft mounted therein, a pulley having a hub mounted on said shaft and extending between said bearings, the outer diameter of the bearing at the upper end of said hub being greater than the diameter of said hub, and the lower end of said hub being of greater diameter than the outer diameter of the lower bearings.

25. In a conveyer belt support, spaced bearings, a shaft mounted therein, a pulley having a tapering hub mounted on said shaft and extending between said bearings, the diameter of the smaller end of the hub being less than the diameter of the bearing adjacent thereto, and the diameter of the larger end of said hub being greater than the diameter of the bearing adjacent thereto.

FRANS IVAR L. BYLGER.